(12) United States Patent
Nelms

(10) Patent No.: US 8,620,731 B2
(45) Date of Patent: Dec. 31, 2013

(54) INVERTED TIER REBATE SYSTEM

(75) Inventor: David W. Nelms, Lake Forest, IL (US)

(73) Assignee: Discover Financial Services LLC, Riverwoods, IL (US)

( * ) Notice: Subject to any disclaimer, the term of this patent is extended or adjusted under 35 U.S.C. 154(b) by 3707 days.

(21) Appl. No.: 10/700,686

(22) Filed: Nov. 3, 2003

(65) Prior Publication Data

US 2005/0096976 A1    May 5, 2005

(51) Int. Cl.
*G06Q 30/00*    (2012.01)

(52) U.S. Cl.
USPC ........................................ 705/14.1

(58) Field of Classification Search
USPC ................................. 705/14, 14.1
See application file for complete search history.

(56) References Cited

U.S. PATENT DOCUMENTS

| | | | |
|---|---|---|---|
| 5,933,817 A * | 8/1999 | Hucal | 705/39 |
| 6,055,573 A * | 4/2000 | Gardenswartz et al. | 709/224 |
| 2004/0068438 A1 * | 4/2004 | Mitchell et al. | 705/14 |

* cited by examiner

*Primary Examiner* — Daniel Lastra
(74) *Attorney, Agent, or Firm* — Leydig, Voit & Mayer, Ltd.

(57) ABSTRACT

An inverted tier award system for financial alternatives to currency is presented, wherein a consumer using the financial alternative to currency is rewarded based on the purchases made by the consumer within a given time frame. Award rates can vary based on the total value of purchases made within a given time frame, with higher award rates assigned to lower value ranges to motivate those consumers to increase their purchases made using the financial alternative to currency. Additionally, higher award rates at lower value ranges can increase consumer loyalty and provide consumers access to their awards more quickly and more often. The award rates or award access can be modified to achieve greater profitability or to further other goals of the implementing organization.

13 Claims, 1 Drawing Sheet

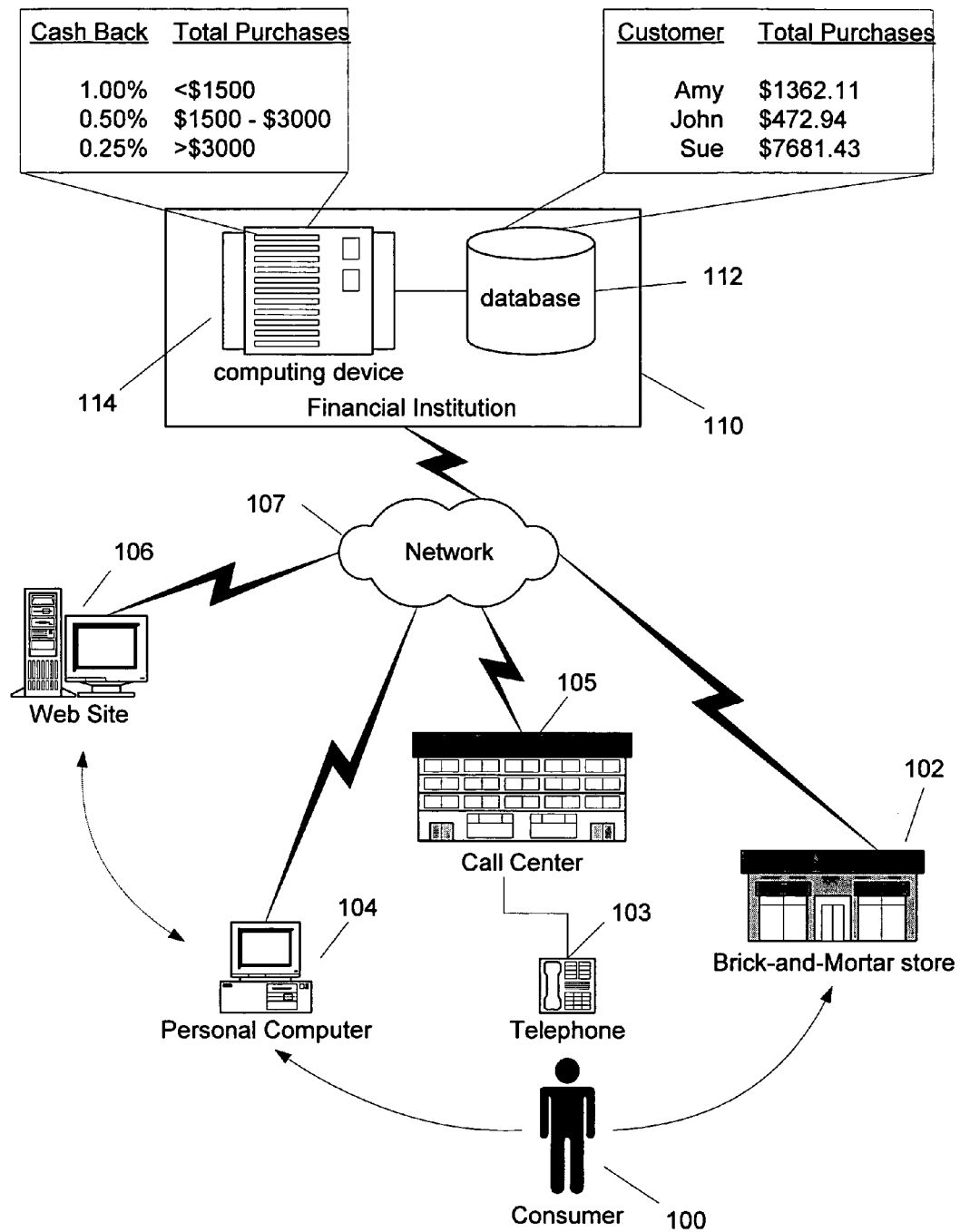

INVERTED TIER REBATE SYSTEM

FIELD OF THE INVENTION

This invention relates generally to consumer rebate systems and more particularly to a rate structure for cash value based consumer rebate or award system.

BACKGROUND

As credit cards, debit cards, and other alternatives to currency have grown in popularity, the competition among the institutions that provide these financial instruments has also increased. Today, many consumers choose a credit card, debit card, or the like, based on the financial incentive to the consumer for using such a card. For example, some credit cards offer low interest rates on balances carried from month to month, other credit cards offer miles or points in frequent flyer programs, while still others offer low fees for common financial transactions.

One popular incentive offered to consumers of credit cards is a cash or cash-equivalent award or rebate as a percentage of the consumer's purchases. Generally, such money back award systems provide as an award a percentage of the dollar amount of the total purchases made by a consumer within a given time frame, usually one year. In an effort to balance the costs of administering the system with the benefits and incentives provided to consumers, the percentage used to calculate the cash or cash-equivalents that will be provided to the consumer will vary depending on the dollar amount of the consumer's purchases. Specifically, the percentage will increase as the total dollar value of the consumer's purchases increases. An exemplary award structure is shown below in Table 1. Note the increase in the percentage used to calculate the award being returned to the consumer as a function of the total dollar amount spent by the consumer.

TABLE 1

| Percentage of incremental purchase value returned as cash to the consumer | Total purchases for the year |
| --- | --- |
| 0.25% | <$1500 |
| 0.50% | $1500–$3000 |
| 1.00% | >$3000 |

As can be seen from Table 1, consumers who spend more than $3000 in one year are offered the highest percentage money back once the level of spending reaches $3000 for the year. Thus, for amounts above $3000, the consumer can receive one dollar in cash or cash-equivalent credits for each $100 the consumer spends, whereas the consumer would only receive 25 cents for each $100 the consumer spends if the total spending by the consumer for the year was less than $1500.

However, empirical evidence of tiered rebate systems such as that illustrated in Table 1 indicates that such tiered systems may not, in fact, adequately encourage certain consumers to increase the value of the purchases they make using the credit card. Instead, empirical evidence suggests that many consumers do not even make a sufficient amount of purchases on their credit card to exceed the lowest award tier, such as the 0.25% tier shown in Table 1. For such consumers, given the relatively low award percentage, the present rebate system does not provide an adequate incentive to use the credit card in question.

At the same time, other empirical evidence indicates that the consumers who do reach the highest tiers of a money back award structure may be sufficiently motivated to use the credit card in question even without a relatively high award percentage, such as is illustrated in Table 1. Thus, the present structure of rebate award programs may not provide incentives to credit card users in the most efficient manner possible.

BRIEF SUMMARY OF THE INVENTION

Embodiments of the invention provide an inverted tier cash or cash equivalent award system for use with credit cards, debit cards, or other alternatives to currency.

In one embodiment, the inverted tier award system provides an award based on a percentage of the dollar amount purchased by a consumer within a given time frame using the credit card, debit card, or other cash alternative. Specifically, the percentage on which the award is based decreases as the dollar amount purchased by the consumer increases. In one example, the percentage on which the award is based can begin at 1% for purchases under $1500 total for a calendar year, decrease to 0.50% for purchases between $1500 and $3000 total for a calendar year, and finally decrease to 0.25% for purchases above $3000 dollars for a calendar year. Other examples can have more or less tiers, higher or lower purchase limits, or higher or lower award rates.

In another embodiment, the inverted tier award system is used by financial institutions to increase loyalty and encourage increased credit card usage by a large group of consumers, while at the same time, providing adequate incentive for continued card usage by other groups of consumers.

In a further embodiment, the inverted tier award system can be modified by the implementing institution to provide for special offers that increase the award returned to the consumer. Special offers can include increased awards on some or all of the consumer's purchases. For example, purchases made during a given time, or at a particular store may result in a larger award than equivalent purchases made elsewhere or at other times. Special offers can also include the ability for the consumer to increase the award by spending the award in a specified manner, such as at particular merchants.

In a still further embodiment, the inverted tier award system can provide awards to consumers at predetermined levels or time frames. For example, awards may be provided to the consumer only in specific increments, such as $20 increments. Alternatively, awards may be provided to consumers only during a given time frame, such as the last week of a month.

In yet another embodiment, the inverted tier award system is implemented through the use of computer-executable instructions which can track the total spending by a given consumer within a pre-determined time frame, such as one year, and can apply the percentages provided by the inverted tier award system to determine an award to be credited to the given consumer. The computer-executable instructions can also include instructions for providing the award to the consumer in predetermined increments, such as $20 increments, and can also include instructions for increasing the award, such as through bonus programs or special offers. An increase in the award returned to the consumer may apply across all of the purchases the consumer has made, or only particular purchases, such as at specified stores, or for a specified period of time.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 1 is a general overview of the operation of a method and system contemplated by an embodiment of the present invention.

DETAILED DESCRIPTION

Well designed award programs create additional revenue and foster consumer loyalty without an unacceptable increase in costs to the institution implementing the award program. In the field of financial alternatives to currency, such as credit cards, debit cards, and the like, one popular award program is a "money back" award program (sometimes referred to as a "rebate" program) wherein the user of the financial alternative to currency receives an award in a pre-defined proportion to the value of the purchases made using the financial alternative to currency. An inverted tier award program, wherein the proportion of the award to the value of the purchases decreases as the total value of purchases in a given time period increases can solve many of the problems associated with more traditional money back award programs, including improving efficiency and reducing the overall cost of the award program, and increasing the overall revenue from consumers using the financial alternative to currency.

For simplicity, the description that follows will be provided by reference to a specific type of financial alternative to currency known in the art as a "credit card". However, as will be clear to those skilled in the art, no aspect of the present invention is specifically limited to credit card applications. Therefore, it is intended that the following description also encompass the use of the present invention with many other forms of financial alternatives to currency, including debit cards, single-use cards, pre-paid cards, electronic currency (such as might be provided through a cellular telephone or personal digital assistant), automated collection systems (such as an electronic toll collection system), and the like.

Similarly, while the description that follows will, for simplicity, be provided by reference to a specific type of award, known in the art as a cash rebate award, it is not intended to limit the use of the present invention to award systems dealing only with cash or money per se. For example, the present invention can be applied to award programs offering certificates, rebates, coupons, credits, discounts, refunds, and the like. In addition, the present invention is equally applicable to award systems based on airline miles, hotel frequent stay points, and the like, and the description that follows is intended to encompass all such awards.

A financial institution providing alternatives to currency, such as credit cards, generally receives income from at least two sources: (1) the merchant, who remits to the financial institution a fee that is customarily a percentage of the purchase price of an item purchased by a consumer using the financial institution's credit card and (2) the consumer, who pays interest charges on unpaid balances that are generally, for consumer purchases, at a rate in excess of the prime rate of interest. Therefore, to increase income, a financial institution offering credit cards seeks to increase the total value of goods purchased by consumers using that institution's credit cards, which directly increases the income received from merchant fees and indirectly may increase the unpaid balance maintained by consumers, thereby increasing interest revenue. One common mechanism for increasing the total value of the goods purchased by consumers using the financial institution's credit cards is to offer an award, such as a cash rebate award, that is directly based on the total value of the goods purchased within a given time frame.

As described above, cash rebate award programs often operate by using a tiered relationship between the total purchase amount and the amount of the award. Specifically, as shown in Table 1 above, the ratio between the amount of the award and the value of the consumer's purchases increases as the consumer's total purchases within a given time period increase in value. Thus, while consumers spending less than a pre-selected amount during a pre-selected time frame may only receive an award equivalent to a small percentage of the value of their purchases, other consumers who spend above a pre-selected amount during the pre-selected time frame may receive an award equivalent to a greater percentage of the value of their purchases. Table 1 illustrates three such tiers: a low tier for total purchases valued less than $1500 per year, a middle tier for total purchases valued between $1500 and $3000 per year, and a high tier for total purchases valued above $3000 per year.

While in theory such a cash rebate system should cause consumers to increase their purchases made with the financial institution's credit cards, thereby increasing the income to the financial institution, practical experience has shown that the increases are limited. Empirical evidence suggests that many consumers do not use their credit cards sufficiently to reach even the middle tier of the standard tiered rebate award system described above. Therefore, for those consumers, the standard tiered rebate award system does not provide adequate incentive to increase card usage, since any initial extra purchases such consumers would make using the card would only receive the lowest percentage award rate until the total level of usage was enough to move into a higher tier.

To more directly target these consumers, one embodiment of the present invention contemplates an inverted tier money back award system. By inverting the award rates, and providing the highest rate at the lowest tier, the inverted tier money back award system contemplated by the present invention provides, to a large group of consumers who do not generally reach even the middle tier, an increased incentive to make additional purchases using their card.

An additional advantage of the inverted tier money back award system contemplated by the present invention is an increase in the efficiency in administering the system. By inverting the award rates, and providing the lowest rate at the highest tier, the inverted tier rebate system allows the financial institution to provide increased overall consumer incentives at a lower overall cost.

An exemplary inverted tier money back award rate structure is shown in Table 2 below. For comparison purposes, the total spending levels for the various tiers in the exemplary rate structure shown in Table 2 are identical to those enumerated in Table 1 above, which illustrated the conventional money back award rate structure. However, as shown in Table 2, the low tier, corresponding to less than $1500 total purchases per year in the present example, receives the greatest rebate as a percentage of the total purchases. Conversely, the high tier, corresponding to total purchases exceeding $3000 per year in the present example, receives the lowest rebate as a percentage of the total purchases.

TABLE 2

| Percentage of incremental purchase value returned as cash to the consumer | Total purchases for the year |
| --- | --- |
| 1.00% | <$1500 |
| 0.50% | $1500–$3000 |
| 0.25% | >$3000 |

As will be evident to those skilled in the art, an embodiment of the present invention is not limited to a three-tiered award system having the illustrated purchase level thresholds. Specifically, an embodiment of the present invention contemplates an inverted tier award system having greater or fewer than three tiers, and the award percentages for some or all of the tiers can be greater or less than those shown in Table 2. Similarly, the purchase level thresholds for some or all of the tiers can also be greater or less than those shown in Table 2, and the tiers can have narrower or broader total purchase ranges. Nevertheless, for illustrative purposes, an embodiment of the invention may be described in reference to the exemplary rate structure shown in Table 2.

Because many consumers fall into the lowest tier, an inverted tier award rate structure, such as that shown in Table 2, provides significantly more incentive for those consumers to purchase additional items than does a standard tier money back award structure, such as that shown in Table 1. For example, using the exemplary award rate structures shown in Tables 1 and 2, additional purchases for those consumers in the lowest tier are initially rewarded at only a 0.25% money back rate with the standard tier award structure, while they are rewarded at a 1.00% rate with the inverted tier award structure. Consequently, the inverted tier award structure of Table 2 in theory is four times more likely to encourage additional card usage by consumers in the lowest tier than is the standard award structure of Table 1. Furthermore, because empirical evidence suggests that many consumers tend to fall into the lower tiers, the inverted tier award system can succeed in increasing card usage by a large number of consumers.

The inverted tier award system can also increase consumer loyalty, especially among consumers whose spending habits may generally place them into the lowest tier. For such consumers, an inverted tier award system may provide a greater award than any other credit card they may use. Consequently, such consumers may choose to use an inverse tier award credit card instead of other credit cards they may also own, thereby increasing not only their usage of the card, but also their loyalty to the card, and possibility to the financial institution offering the card as well.

Additionally, the inverted tier award system can provide awards more quickly to consumers whose spending habits may generally place them into the lowest tier. For example, if a consumer is not allowed to access an award until a threshold amount has accumulated in the consumer's award account, an inverted tier award system can enable many consumers in the lowest tier to more quickly exceed the threshold amount, allowing them to enjoy the benefits of the award system sooner and more frequently.

Alternatively, many consumers who use their credit cards sufficiently to achieve the highest tier are adequately motivated to use the card even without a relatively high rebate percentage. Therefore, an inverted tier money back award rate structure, such as that shown in Table 2, can reduce the expenses incurred by the financial institution in providing rebate awards to these consumers. For example, using the exemplary award rate structures shown in Tables 1 and 2, consumers who use their credit cards for purchases exceeding $3000 are rewarded with a 1.00% money back rate for all purchases above $3000 with the standard tier award structure, while those same consumers are only rewarded with a 0.25% money back award rate with the inverted tier award structure.

Turning to FIG. 1, an implementation of the inverted tier rebate award rate structure contemplated by an embodiment of the present invention is shown with reference to an overall credit card usage environment. A consumer 100 can use a credit card to purchase goods or services at any number of locations. Exemplary locations illustrated in FIG. 1 include a brick-and-mortar store 102, a call center 105, accessed through a telephone 103, or a web site 106, accessed through a computer 104. As will be known by those skilled in the art, each of the brick-and-mortar store 102, the call center 105, and the web site 106 may offer a variety of goods and services. For example, the brick-and-mortar store 102 can be a grocery store or mass-market retailer, or it can be a doctor's office or an accountant's office. Similarly the call center 105 can, for example, be a catalog retailer or a public utility, such as a phone or cable company. Additionally, the web site 106 can, for example, be an on-line retailer, or it can be an interface to private party transactions, such as through an auction web site.

Once the consumer 100 has decided to purchase goods or services, using their credit card, from either the brick-and-mortar store 102, the call center 105, or the web site 106, an authorization can be obtained from a financial institution 110. Generally, financial institution 110 is the issuer of the credit card being used by the consumer. An authorization from the financial institution 110 allows the consumer 100 to receive goods and services from providers 102, 105, or 106 and allows the providers to be reimbursed by the financial institution 110.

Typically, an authorization can be obtained from the financial institution 110 through a network 107, which can be the Internet, a dedicated secure network, or even the phone system, such as through a voice phone call to a representative of the financial institution 110. The financial institution 110 can maintain a database, such as database 112 to record each of the transactions performed by consumers using the financial institution's credit cards. A computing device or system, such as computing device 114, can be used to monitor the transactions stored in the database 112, and can calculate various derived information, including interest charges, spending habits, and money back awards, though, for simplicity, only the latter is illustrated in FIG. 1.

The consumer 100 can use their credit card at any provider of goods or services, such as providers 102, 105, and 106. The providers can communicate with the financial institution 110, such as through the network 107, to obtain authorization for the consumer's purchase and to receive reimbursement from the financial institution. The financial institution can store the transaction in a database 112 and can determine, based upon known algorithms that could be stored in computing device 114, the amount owed to the financial institution 110 by the consumer 100. The financial institution 110 can derive revenue from both the fees charged for the transaction to the providers such as providers 102, 105, and 106, and it can derive revenue from fees and interest charges paid by the consumer 100.

To encourage increased card usage by consumers, the financial institution can implement an inverted tier money back award system as contemplated by one embodiment of the present invention, and as described in detail above. Thus, as illustrated by the exemplary computational table shown stored at computing device 114, a low tier for purchases below $1500 in total value for a year can be rewarded at a rate of 1.00%, while a middle tier for purchases between $1500 and $3000 in total value for a year can be rewarded at a lower rate, such as 0.50%, and a high tier for purchases above $3000 in total value for a year can be rewarded at a still lower rate, such as 0.25%.

Database 112 is shown in FIG. 1 as containing three illustrative accounts. An account for Amy having total purchases of $1362.11 for the year, an account for John having total purchases of $472.94, and an account for Sue having total purchases of $7681.43. Computing device 114 can determine that Amy's current rebate award is $13.62, John's is $4.72, and Sue's is $34.20 based on the exemplary computation table illustrated in FIG. 1. However, each of the consumers can also track their own awards, such as through web sites, monthly statements, personal record keeping, and other like methodologies. Thus, Amy and John are likely aware that each additional purchase will receive 1.00% money back, as neither of them has yet reached the exemplary $1500 threshold for the low tier. As a result, John and Amy may be motivated to increase their card usage, at least until they have spent a total of $1500 for the year. Conversely, while Sue will only be receiving a 0.25% rebate award rate on additional purchases, this still is likely to be an adequate incentive for her to use the card.

As explained in detail above, the inverted tier award system contemplated by an embodiment of the present invention provides an increased incentive for consumers in the low tier to purchase additional goods and services using the credit card. Applying the exemplary tiered structure of Table 2 above, it may be expected that an increased number of consumers may use their credit cards for an increased total expenditure. For example, consumers who typically may spend a total of $500 may now increase their purchases using the credit card to $1000. Similarly, those consumers who may typically spend a total of $800 may now increase their purchases using the credit card to $1200. In such a manner, increased usage of the credit card by consumers across a lower range of typical spending amounts may be a consequence of the inverted tier award system.

Conversely, as would be understood by those skilled in the art, the inverted tier rebate system contemplated by an embodiment of the present invention may result in decreased rebates by the financial institution to those consumers who use their credit cards significantly. Nonetheless, many such consumers may be sufficiently motivated by the available rebate to maintain their usage of the card. For example, the number of consumers who typically may use the credit card for purchases totaling $9,000 may not change significantly as a consequence of the inverted tier award system. Thus, consistent credit card usage by consumers across a higher range of typical spending amounts may also be a consequence of the inverted tier award system.

An embodiment of the present invention also contemplates an inverted tier rebate system which provides for varying award rates or levels depending upon the particular merchant at which purchases are made, or depending upon the period of time during which purchases are made. For example, if the financial institution sought to promote a particular merchant, such as due to a cross-licensing agreement, a cross-promotion agreement, or simply in exchange for payment, the financial institution could increase the award rates for purchases made at the promoted merchant. Thus, for example, the financial institution could offer 2.00% rebate or award for all purchases, under $1500 of total purchases, made at the promoted merchant. Alternatively, the financial institution could increase the tier limits for purchases made at the promoted merchant. For example, purchases up to $1500 of total purchases could be awarded at a 1.00% rate, while purchases at the promoted merchant could receive the 1.00% rate even though they exceeded the $1500 total purchase limit for the first tier.

Another embodiment of the present invention contemplates providing consumers access to earned awards through predefined methods, times or amounts. For example, the financial institution could provide consumers access to the awards only in predefined increments, such as $10 or $20 increments. In such a case, a consumer with an accumulated award balance amount that is smaller than the smallest increment would be required to wait until the award balance is increased by additional card usage before being permitted to access it. Alternatively, the financial institution could allow consumers access to their accumulated awards only on particular days, such as the last five days of a month, or the first five days of the consumer's billing cycle. Such temporal limitations could decrease the variability of consumers accessing their awards, and allow the financial institution greater flexibility in managing the award system. In addition, the financial institution could offer consumers access to their accumulated awards through predefined methods, such as through credits to their accounts, or gift cards or coupons for use at selected merchants. Such alternative methods of accessing the awards can also be used to promote particular merchants, such as by increasing the awards if the consumer agrees to accept the award in the form of a certificate at a promoted merchant.

The inverted tier award system contemplated by an embodiment of the present invention, described in detail above, together with the alternative embodiments also described in detail above, can be implemented through the use of computer-readable instructions performing predefined steps in a manner known to those of skill in the art. For example, the calculation of the amount of the award to be given to each consumer can be performed by a computing device through programming or otherwise storing computer-readable instructions or data structures defining the tiers, limits, and award rates in a manner to perform the calculations described above. Similarly, a computing device can allow consumers access to their accumulated awards, such as through a web site on the Internet, or through a proprietary network or proprietary executable instructions residing on each consumer's computer. A computing device executing computer-readable instructions can also take into account any applicable modifications to the award system, such as the increased award levels for purchases at promoted merchants described in detail above.

As can be seen, an inverted tier award system for financial alternatives to currency is presented. In view of the many possible embodiments to which the principles of this invention may be applied, it should be recognized that the embodiments described herein with respect to the drawing figures are meant to be illustrative only and should not be taken as limiting the scope of invention. Therefore, the invention as described herein contemplates all such embodiments as may come within the scope of the following claims and equivalents thereof.

What is claimed is:
1. A system for determining an award amount accrued to a consumer due to at least one transaction, the transaction involving the consumer's use of a financial alternative to currency to purchase goods or services, the system comprising:

a database containing a data record of the transaction and an account record for the consumer, the account record including a dollar-value sum which includes the transaction amount; and a computing device coupled to the database for accessing at least one of the records and for calculating the award amount, from either the dollar-value sum or the transaction amount, by applying thereto an award formula comprising a selected award rate from an inverted tier structure comprising a first tier corresponding to a first value range of goods or services purchased and providing a first award rate and a second tier corresponding to a second value range of goods or services purchased and providing a second award rate, wherein the minimum of the second value range is higher than the maximum of the first value range and the second award rate is lower than the first award rate, the inverted tier structure being stored in the computing device.

2. The system of claim 1, wherein calculating the award amount comprises applying the first award rate to the total value of goods or services purchased that are within the first value range and applying the second award rate to the total value of goods or services purchased that are within the second value range.

3. The system of claim 1, wherein the first value range and the first award rate have been previously selected to increase spending by consumers who historically spend less than the maximum value in the first value range during a predetermined time period, and wherein the second value range and the second award rate have been previously selected to avoid significantly decreasing spending by consumers who historically spend at least the maximum value in the second value range.

4. The system of claim 1, wherein the dollar-value sum corresponds to purchases made within a predetermined time frame.

5. The system of claim 1, the computing device further for accessing an indication that the transaction involved a favored merchant, and wherein the inverted tier structure for use in calculating the award amount for the transaction with the favored merchant is a favored inverted tier structure comprising one or more of the following:
   an increased maximum in the first value range;
   an increased maximum in the second value range;
   an increased first award rate; and
   an increased second award rate.

6. The system of claim 1, wherein the financial alternative to currency is a credit card.

7. The system of claim 1, wherein the inverted tier structure comprises a third tier corresponding to a third value range of goods or services purchased and providing a third award rate, wherein the minimum of the third value range is higher than the maximum of the second value range and the third award rate is lower than the second award rate.

8. A method for determining an award amount accrued to a consumer due to at least one transaction, the transaction involving the consumer's use of a financial alternative to currency to purchase goods or services from a merchant, the method comprising:
   receiving, through a network, information about the transaction, the information including the transaction amount;
   storing the information about the transaction, including the transaction amount, in a database transaction record;
   accessing with a computing device a database account record for the consumer, the account record including a dollar-value sum which includes the transaction amount; and
   calculating with the computing device an award amount by applying to the dollar-value sum an award formula comprising a selected award rate from an inverted tier structure comprising:
      a first tier corresponding to a first value range of goods or services purchased and providing a first award rate, and
      a second tier corresponding to a second value range of goods or services purchased and providing a second award rate;
   wherein the second value range is higher than the first value range and the second award rate is lower than the first award rate.

9. The method of claim 8, wherein calculating the award amount comprises applying the first award rate to the total value of goods or services purchased that are within the first value range and applying the second award rate to the total value of goods or services purchased that are within the second value range.

10. The method of claim 8, further comprising:
    determining the first value range and the first award rate so as to increase spending by consumers who historically spend less than the maximum value in the first value range during a billing period; and
    determining the second value range and the second award rate so as to avoid significantly decreasing spending by consumers who historically spend at least the maximum value in the second value range.

11. The method of claim 8, further comprising:
    determining, by the computing device, that the transaction involved a favored merchant;
wherein the calculating step comprises applying a selected award rate from a favored inverted tier structure comprising one or more of the following:
    an increased maximum in the first value range;
    an increased maximum in the second value range;
    an increased first award rate; and
    an increased second award rate.

12. The method of claim 8, wherein the financial alternative to currency is a credit card.

13. The method of claim 8, wherein the inverted tier structure comprises a third tier corresponding to a third value range of goods or services purchased and providing a third award rate, wherein the minimum of the third value range is higher than the maximum of the second value range and the third award rate is lower than the second award rate.

* * * * *